DAVIS & SMITH.
Seed-Planter.
No. 67,168. Patented July 30, 1867.
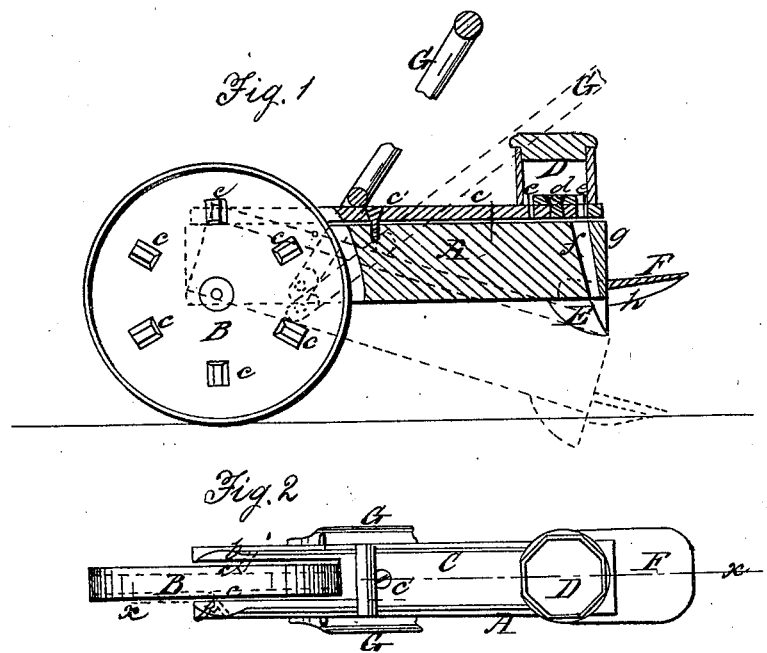

United States Patent Office.

HERMON V. DAVIS, OF AMHERST, AND GEORGE E. SMITH, OF BLAKEVILLE, NEW HAMPSHIRE, ASSIGNORS TO GEORGE E. SMITH.

Letters Patent No. 67,168, dated July 30, 1867.

IMPROVEMENT IN SEEDING MACHINE.

*The Schedule referred to in these Letters Patent and making part of the same.*

TO ALL WHOM IT MAY CONCERN:

Be it known that we, HERMON V. DAVIS, of Amherst, county of Hillsborough, and GEORGE E. SMITH, of Blakeville, county of Cheshire, and State of New Hampshire, have invented a new and useful Improvement in Seeding Machines, of which the following is a full, clear, and exact description, reference being had to the accompanying drawings, in which—

Figure 1 is a longitudinal sectional view taken in line $x\ x$, fig. 2, and

Figure 2 is a plan or top view of a seeding machine embracing our improvement.

Similar letters of reference denote corresponding parts in both figures.

Our invention relates to that class of seeding machines more especially adapted to use in sowing garden seeds, where the machine generally is operated by hand, being, in this instance, propelled over the ground, previously prepared for the reception of the seed, in a manner resembling the ordinary wheel-barrow, the wheel being provided with cams, teeth, or spokes, through which a vibratory movement is given to the seed-hopper in such manner as to agitate the seed contained therein, and enforce a steady and constant delivery thereof, as hereinafter explained.

In the accompanying drawing, A is the frame or frame-bar of the machine, forked at its forward end to receive the ground-wheel B, and form bearings for the opposite ends of its axle, as shown in the drawings. The wheel B is provided upon its opposite sides with cams or teeth $c$, arranged in circles concentric with the axle, through which a vibratory motion is imparted to a forked lever, C, pivoted to the frame at $c'$, (see fig. 1,) and which is provided with ears or inclined pins $b$, so arranged, one in advance of the other, as alternately to come in contact with teeth $c$ on opposite sides of the wheel. Instead of this arrangement of the pins or ears on the forked lever, the teeth or cams on the wheel may be arranged so as to alternate on the opposite sides of said wheel, if preferred. Upon the opposite or rear end of the lever C is mounted the seed-box or hopper D, connected to the lever by a central pivot, $d$, upon which it may be turned or adjusted to bring any one of a number of different-sized openings, $e$, in the bottom of the hopper over the funnel-shaped discharge opening or seed-run $f$, formed through the rear end of the frame-bar, as shown in fig. 1. The opening or seed-run $f$ is made large at the top to adapt it to receive the seed in any and all positions of the vibrating hopper, and tapers downward in such manner as to convey, with accuracy, the seed to the desired point of delivery. $g$ is a removable cap to the discharge opening $f$, which may be taken out for clearing the said opening or run in case it becomes obstructed. E is a drill-tooth, of V form, open in rear, located underneath the frame and in advance of the seed-run, so as to cause the seed to descend through the tooth into the furrow formed in the ground thereby. F is a hinged follower, provided with flaring ribs or teeth $h$, so arranged as to follow closely in the track of tooth E, and serving, after the seed is deposited in the furrow formed thereby, to return the earth thrown out by the tooth, and thereby to lightly cover the seed at a uniform depth. G is a lever-frame or handle, pivoted at its forward end to the frame-bar, and held at any desired relation or angle thereto by means of stops or pins $i$. (see fig. 1.) Said handle serves to propel and properly guide and control the operation of the machine.

The operation is as follows, viz: The seed-box or hopper being properly supplied, and adjusted so as to bring the opening in the bottom thereof over the passage $f$, the machine is propelled by means of handle G, when, through the rotation of wheel B, the cams, teeth, or spokes of the wheel, acting alternately upon the opposite forks of the lever, impart a vibrating motion to lever C and to the seed-box mounted thereon, thereby agitating the seed, and enforcing a steady and constant delivery of the same through opening or passage $f$ into the furrow formed by the drill-tooth. The seed thus deposited is immediately covered by the hinged follower in the manner explained.

Having described the construction and operation of our invention, what we claim, and desire to secure by Letters Patent, is—

1. The seed-box or hopper D, mounted upon the vibrating lever C, and operated from wheel B, in the manner substantially as described.

2. The vibrating hopper, arranged and operating as described, in combination with the funnel-shaped seed-run or discharge opening, substantially as described.

3. The vibrating hopper, provided with discharge openings of different sizes, and arranged to turn upon a central pivot, as described.

HERMON V. DAVIS,
GEORGE E. SMITH.

Witnesses:
M. W. RICHARDSON,
CHARLES RICHARDSON.